Feb. 27, 1962 J. N. BINNS 3,022,690
CONTOUR ROLL-TURNING LATHE
Filed March 25, 1957 9 Sheets-Sheet 1

INVENTOR.
JACK N. BINNS
BY
*J. Warren Kenney, Jr.*
ATTORNEY

Feb. 27, 1962  J. N. BINNS  3,022,690
CONTOUR ROLL-TURNING LATHE
Filed March 25, 1957  9 Sheets-Sheet 5

INVENTOR.
JACK N. BINNS
BY
*J. Warren Kinney, Jr.*
ATTORNEY

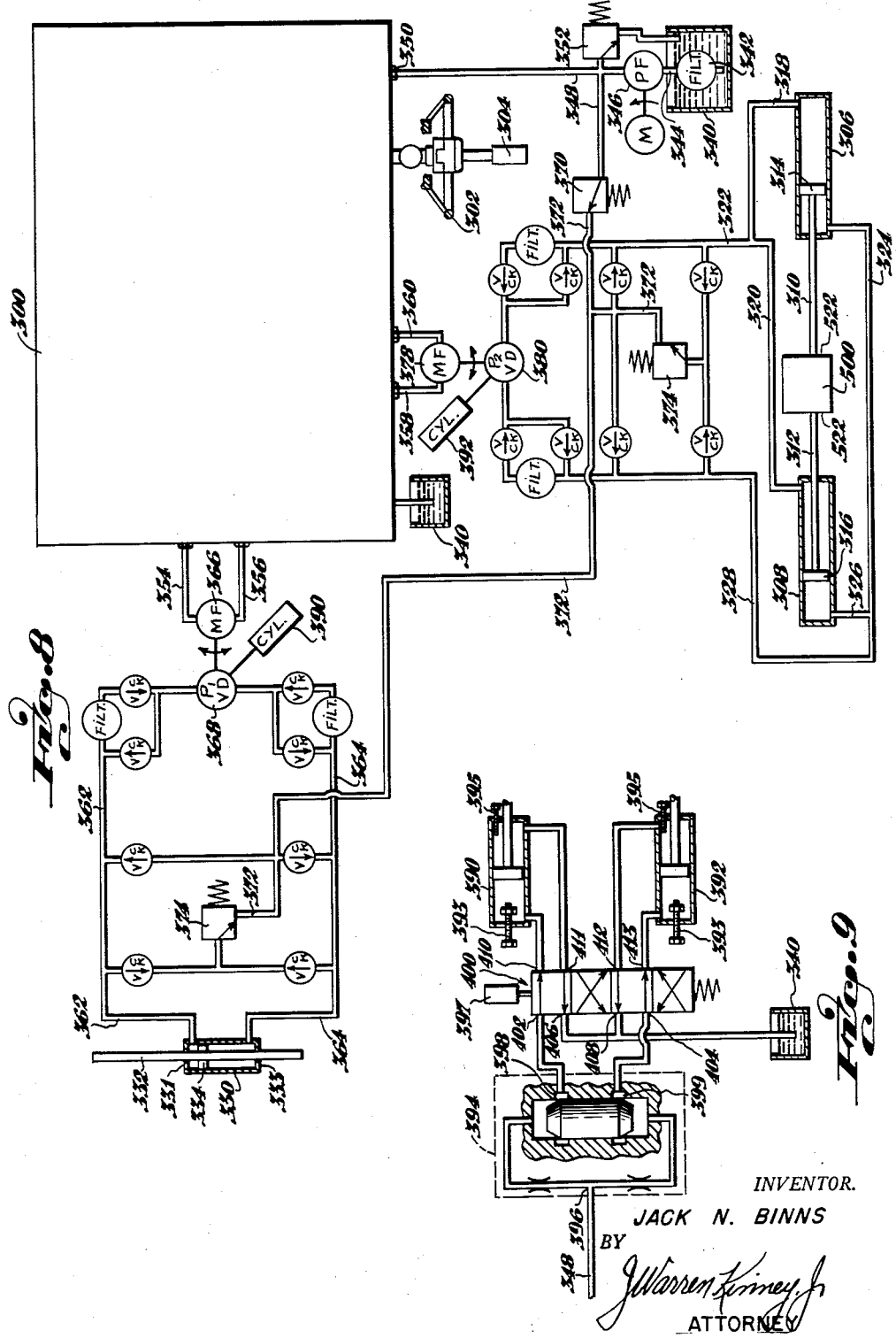

Feb. 27, 1962 J. N. BINNS 3,022,690
CONTOUR ROLL-TURNING LATHE
Filed March 25, 1957 9 Sheets-Sheet 7
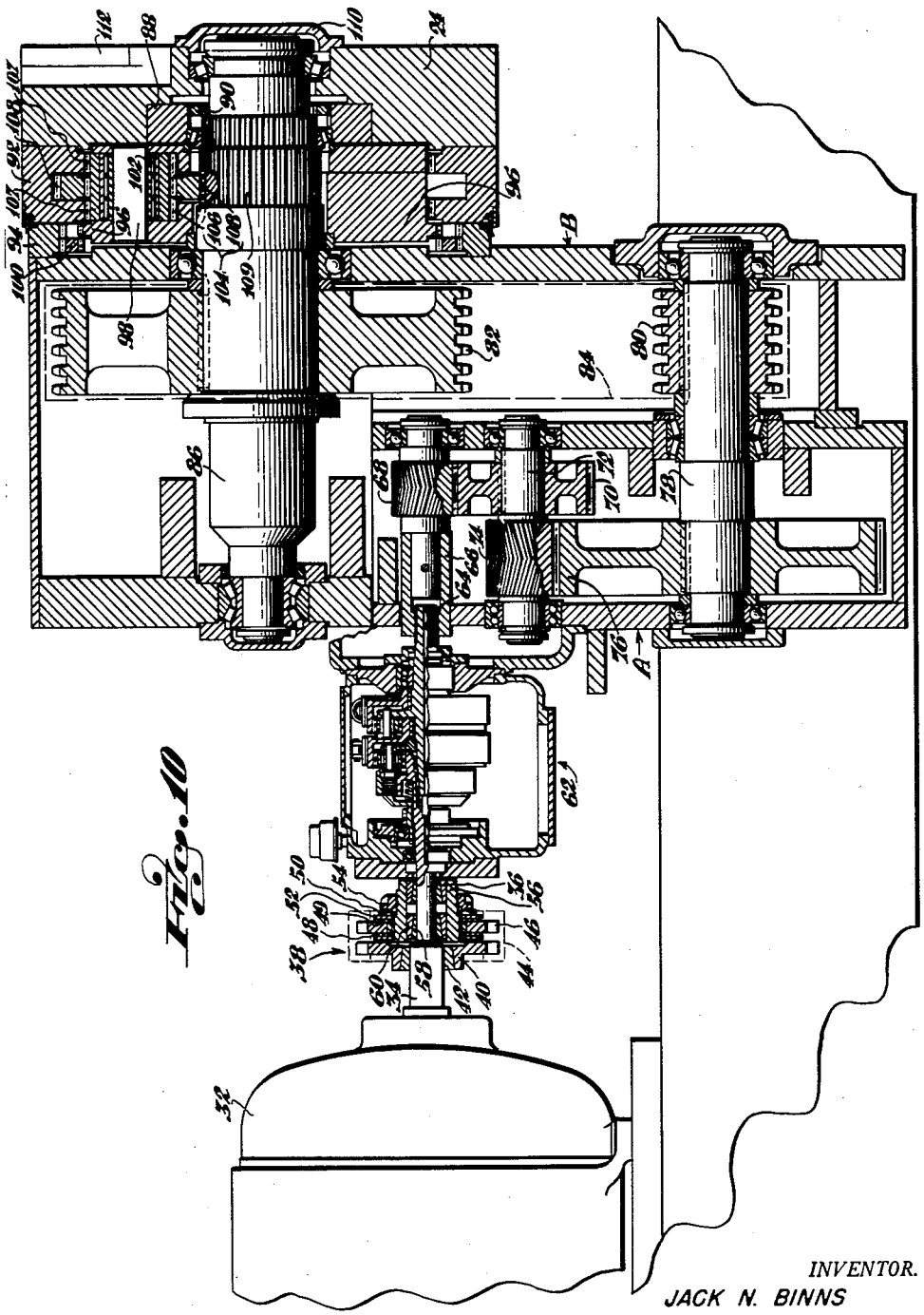
INVENTOR.
JACK N. BINNS
BY
*J. Warren Kinney, Jr.*
ATTORNEY

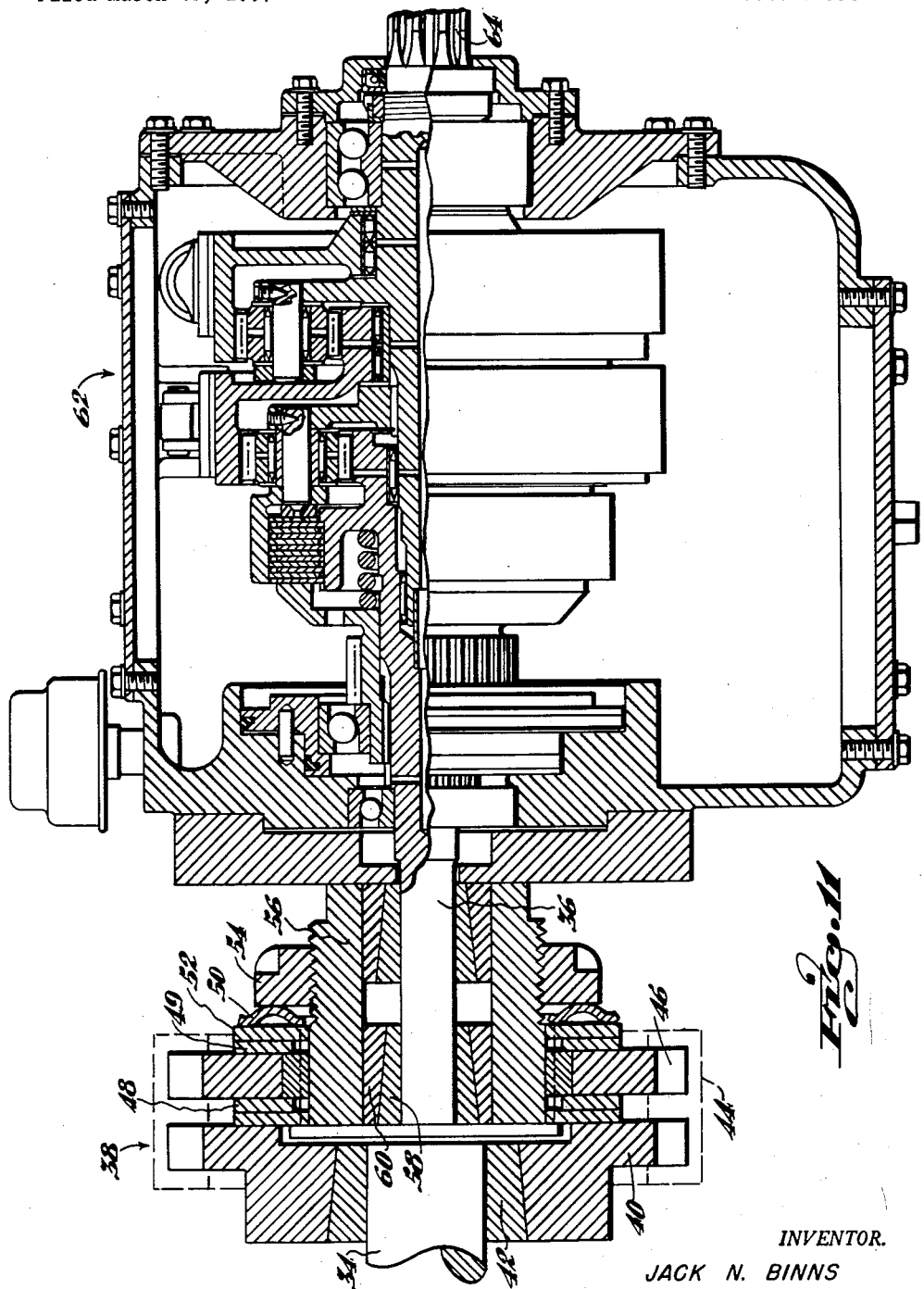

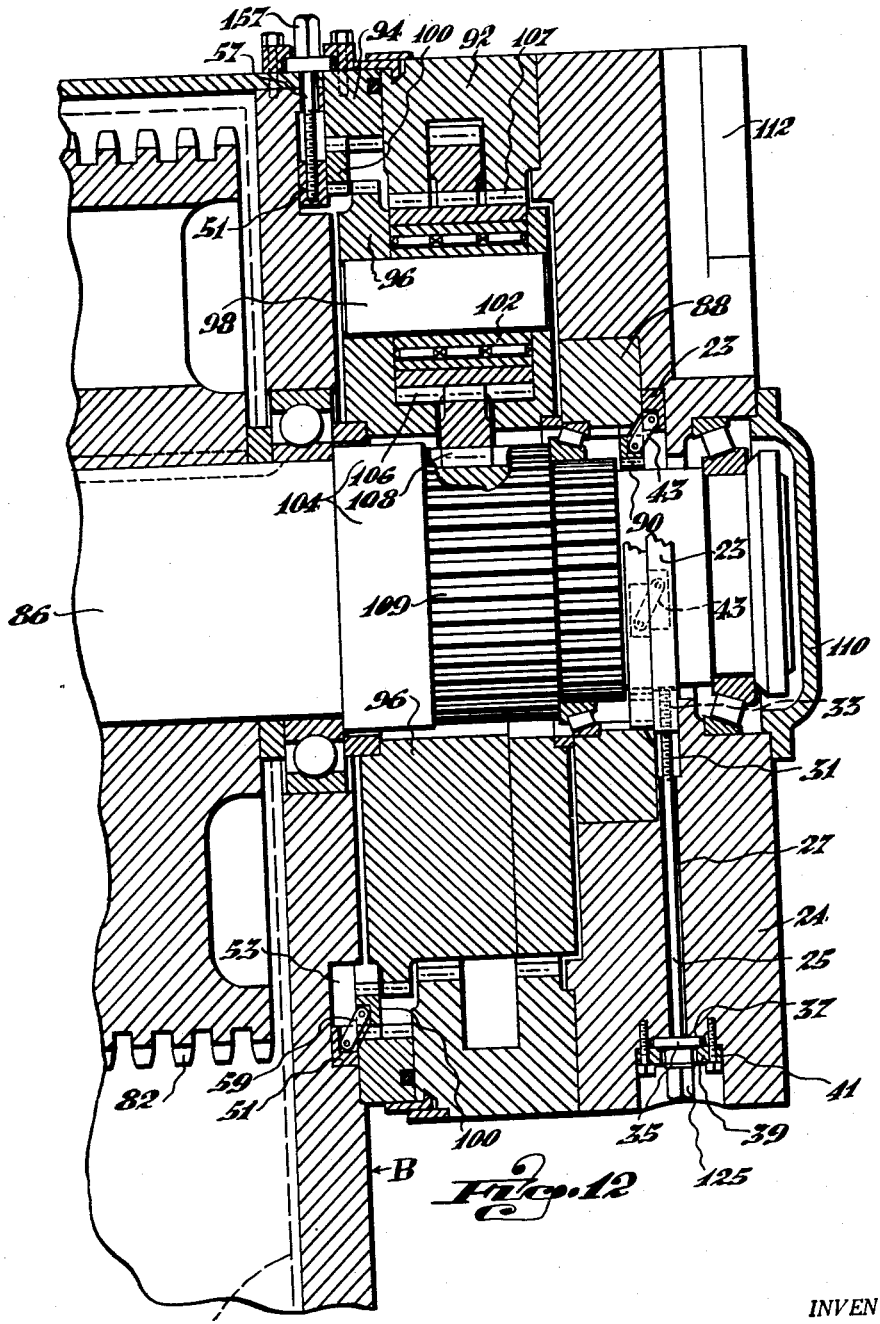

United States Patent Office 3,022,690
Patented Feb. 27, 1962

3,022,690
CONTOUR ROLL-TURNING LATHE
Jack N. Binns, 4836 Oaklawn Drive, Cincinnati 27, Ohio
Filed Mar. 25, 1957, Ser. No. 648,396
7 Claims. (Cl. 82—2)

This invention relates to lathes, and, more particularly, to a contour roll-turning lathe with a piano-rest.

One object of the invention is to provide a roll lathe with automatic contour tracer turning means provided on one side thereof, and with form turning means on the other side thereof, whereby direction of rotation of the work, either forward or reverse, will permit the contour tracing means or the forming means to be selectively utilized.

Another object of the invention is to provide a roll lathe having novel anti-friction ways on the tracing slides of the automatic contour tracer means.

A further object of the invention is to provide a roll-turning lathe with a hydraulic tracing system that is unique with respect to its method of accurately controlling extremely small volumetric flows of oil without impairing its ability to control large volumetric flows.

Another object of the invention is to provide a roll lathe having very thin expendable wear strips in the neck-chucks, which are the journal boxes in which the roll is supported for rotation.

A further object of the invention is to provide a roll lathe with a headstock, having unique driving means, which includes a torque limiting means in the form of an instantaneously operable friction clutch, which arrangement is a decided departure from the presently used electrically actuated limiting devices that are inherently slow acting.

Still a further object of the invention is to provide a roll lathe having a headstock which includes a double planetary reducer, one of which is in the faceplate, and wherein the relationship of the two planetary systems is so correlated that the direction of rotation of the faceplate may be reversed without reversal of any of the driving gears or drive shafts.

Another object of the invention is to provide a roll lathe wherein the means for rotatably mounting the roll relative to the lathe structure is so designed that the cutting forces between the cutting tools and roll are totally contained within the housing members of the lathe and are not transferred to the bed, and wherein only the torque reaction is transmitted directly to the bed.

These and other objects are attained by the means described herein and disclosed in the accompanying drawings, in which:

FIG. 8 is a schematic layout of the complete hydraulic tracing system embodying a detail of the invention.

FIG. 9 is a schematic layout of a control circuit which comprises a detail of the hydraulic system of FIG. 8.

FIG. 10 is a sectional view taken through the gear train of the headstock of the lathe, comprising a detail of the invention.

FIG. 11 is an enlarged sectional view of the torque limit coupling means and input planetary transmission shown in FIG. 10.

FIG. 12 is an enlarged sectional view of means for actuating the splined ring means 90 and 100 for rotating the face plate 24 shown in FIG. 10.

At the outset it should be fully understood that the subject invention is directed to a roll lathe wherein that term is used to distinguish the subject device from lathes in general, and in particular from lathes which, by way of example, are provided with cutting means on both sides of the axial center. The term "roll lathe" specifically denotes a lathe which is used to perform work upon rolls such as are used in steel or aluminum rolling mills and the like. These rolls include axially aligned necks which are usually integral with and project from opposite ends of a roll, said necks serving to rotatably support a roll during its formation and use.

Figure 1:
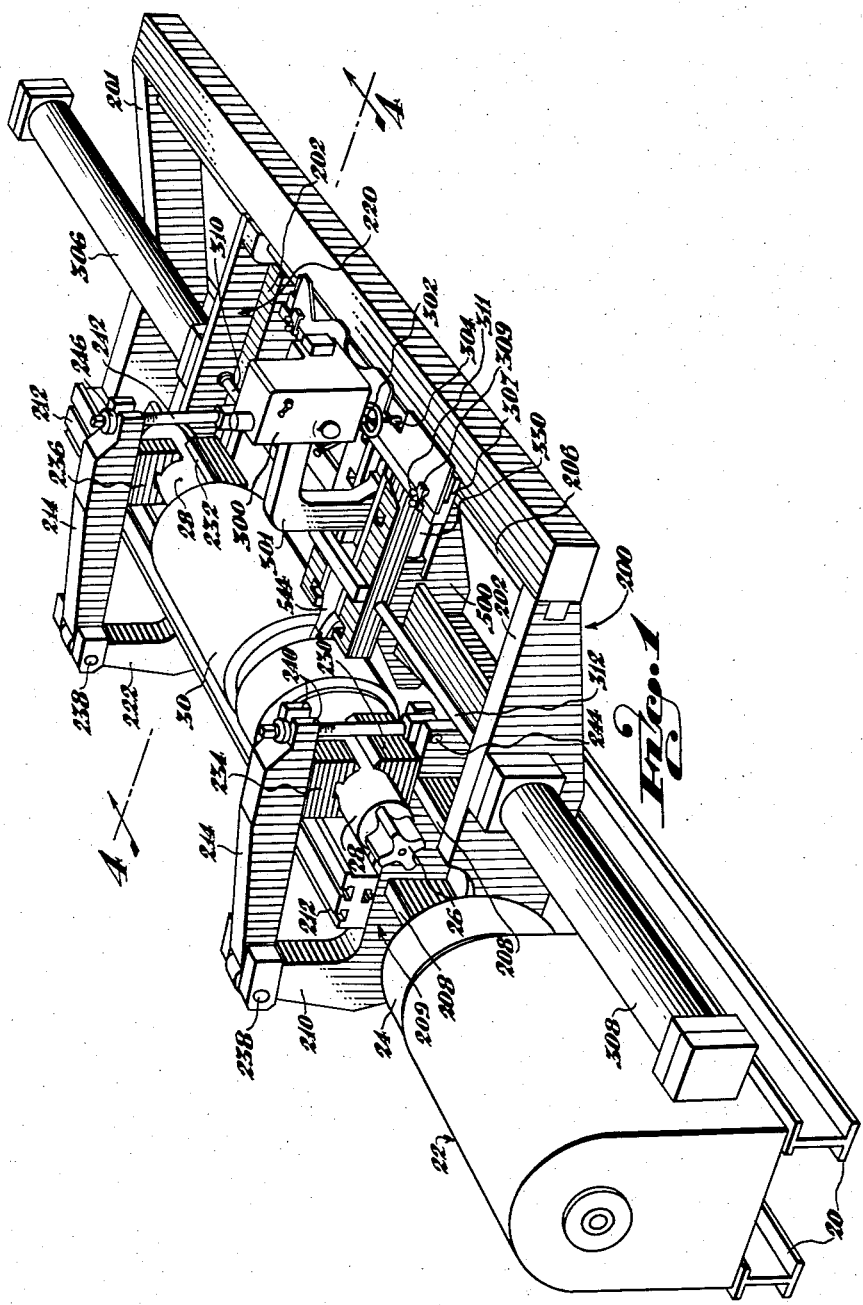
FIG. 1 is a perspective view of a roll-turning lathe embodying the teachings of the present invention.

With reference now to FIG. 1, the numerals 20 denote generally a pair of elongate, laterally spaced bed rails which are integrally connected by means, not illustrated, for forming a bed plate. The numeral 22 denotes generally a headstock suitably secured to the bed rails, said headstock including a faceplate 24 containing suitable coupling means, not illustrated, by which the faceplate is connected in driving relationship with the wabbler 26 formed integral with neck 28 of roll 30; said wabbler, neck and roll body usually being integral.

With particular reference now to FIG. 10, the numeral 32 denotes a variable speed electric motor, preferably, though not necessarily, of direct current type. Motor shaft 34 is connected to headstock input shaft 36 by means of a torque limit coupling indicated generally by the headed arrow 38. By way of example, and not by way of restriction, it will be noted that the coupling may include sprocket 40 secured to shaft 34 by means of a taper lock bushing 42, a chain 44 and a second sprocket 46. The side walls of sprocket 46 are disposed between a pair of laterally spaced friction plates 48 and 49 which comprise the friction surfaces of the torque limit clutch and are suitably loaded by means of a spring element 50 interposed between splined collar 52 and adjusting nut 54 which threadably engages splined body 56. Taper lock bushing 58 and taper lock bushing adapter 60 fixedly connect splined body 56 to shaft 36 whereby sprocket 46 is rotatably journaled relative to shaft 36 with driving connection being made only through friction plates 48 and 49.

Shaft 36 may comprise the input shaft of a commercial planetary transmission denoted generally by the numeral 62, said transmission including output drive shaft 64. It should be understood that the present invention is neither concerned with nor directed to the specific structural details of input planetary transmission 62 nor with the torque limit coupling 38.

It will be understood that the characteristics of the input planetary transmission 62 are such that the rotational speed of output shaft 64 may be the same as the rotational speed of input shaft 36, or it may be lower at a specific fraction thereof, depending upon the ratio of said transmission.

Input planetary transmission 62 represents a variable reduction in which the speed of output shaft 64 is reduced and the torque increased by a like amount; or, wherein the speed and the torque of both shafts 64 and 36 are the same. A fixed reduction gear train is also incorporated in the headstock and is shown on FIG. 10 between letters A and B, in which the speed is reduced and torque is increased by a fixed ratio.

With reference now to the fixed reduction portion of the transmission, the numeral 66 denotes generally a splined sleeve pinned to herringbone stem pinion 68 which couples shaft 64 thereto. Herringbone gear 70 is driven by pinion 68 and keyed to stem 72 of herringbone pinion 74. Pinion 74 drives herringbone gear 76, which is keyed to sprocket shaft 78.

A sprocket pinion 80 keyed to shaft 78 is interconnected to sprocket wheel 82 by means of a flexible drive member such as, by way of example, a multiple strand roller chain 84. Sprocket wheel 82 is keyed to spindle 86, which is coaxial with work-piece or roll 30.

The forward end of spindle 86 terminates in a face-plate 24. According to the teachings of my invention, face-plate 24 may be directly coupled to spindle 86 through splined annulus 88 or indirectly coupled through planetary reduction gears 104.

Annulus 88 is fixedly secured to and carried by face-plate 24. Ring 90 is externally splined to annulus 88 for endwise movement therewith between a fully advanced position in which the ring is out of engagement with spindle 86 and to a fully retracted position with the ring forming a coupling between the annulus 88 and spindle 86 for effecting a "direct" driving connection therebetween. Axial movement of splined ring 90 may be effected by any suitable means, such as, by way of example, a toggle ring 23 actuated by a push-pull rod 25 extending radially through a radial bore 27 in the faceplate 24, see FIG. 12.

The push-pull rod 25 is threaded at one end as at 31 to engage an internally threaded portion 33 of the toggle ring 23. The other end of the push-pull rod may be provided with a thrust collar 35 having an upper face engaging shoulder 37 of bore 27, and a lower face engaging a thrust collar 39 secured to the face plate by means of bolts 41. The free end of push-pull rod 25 may terminate in a headed member 125 to accommodate a wrench, crank or the like.

Toggle ring 23 is connected by three or more toggle links 43 to splined ring 90, whereby diametric movement of the push-pull rod 25 will effect axial shifting of splined ring 90 with respect to shaft 86. From the foregoing, it will be noted that as the push-pull rod 25 is rotated for shifting the toggle ring 23 downwardly, toggles 43 will be swung upwardly in a clockwise direction for advancing splined ring 90 to the left for effecting a driven engagement between annulus 88, which is fixed to face plate 24, and gear 109 of spindle 86, for thereby placing spindle 24 in direct driven relationship with said spindle.

In those instances in which it is desired to decrease the speed of rotation and increase the torque output of faceplate 24 with respect to spindle 86, the splined ring 90 is disengaged: that is, shifted to its forward, inoperative position in disengaged relationship with spindle 86. Thenceforth, rotation of the face plate can be determined by rotation of ring gear 92 fixedly secured to and carried by the rear surface of the faceplate 24. Gear 92 is the driven member of a planetary gear reducer between the spindle 86 and faceplate 24.

The numeral 96 denotes a planetary spider which supports a series of shafts 98 parallel to the axis of spindle 86. Each shaft 98 carries a bearing: such as, by way of example, 102, on which a planetary cluster gear 104, having two sets of gear teeth 106 and 108, is mounted. In the drawing, FIG. 10, the planetary gears 104 have been illustrated as two pieces, said arrangement merely indicating an economical form of construction.

Spindle 86 is provided with external teeth 109 forming the sun gear of the planetary unit, the teeth of which are in engagement with teeth 108 of the planetary gears 104. Ring gear 92 is provided with internal teeth 107 which are engaged by teeth 106 of the planetary gears 104.

Splined ring 100 is axially shiftable from the fully retracted inoperative position, illustrated in FIG. 10, to a forward operative position in which a second splined annulus 94 is connected in fixed relationship with the planetary spider 96. Thenceforth, the spider is restricted from rotation, being directly coupled to the front face B of the headstock, since splined annulus 94 is fixedly secured to, and carried by, the forward face B of the headstock 22.

A running clearance is provided between the adjacent faces of the splined annulus 94 and ring gear 92. Suitable means, such as, by way of example, are illustrated in FIG. 12 may be provided for imparting axial movement to splined ring 100.

A toggle ring 51 is mounted for endwise diametric movement within slot 53 provided in housing member B. Rotation of the headed end 157 of a push-pull rod 57 will impart movement of the toggle rings in a plane at right angle to the axis of spindle 86, which movement may be imparted to splined ring 100 through three or more toggle links 59 which connect the toggle ring 51 and splined ring 100, as best illustrated in the lower left portion of FIG. 12.

Upward movement of toggle ring 51 will shift splined ring 100 to the right and axially with respect to shaft 86 for placing the head stock in driven relationship with spindle 86 through the planetary gearing. The foregoing is accomplished by effecting engagement of splined ring 100 with splined annulus 94 and the planetary spider 96.

It should be understood that each of splined rings 90 and 100 may be simultaneously disposed in inoperative or non-driving relationship. In which event, the faceplate 24 will be freely rotatable upon, and, relative to, spindle 86. However, it should be noted that only one or the other of splined rings 90 and 100 may be shifted to an operative, driving relationship at any time. When rings 90 and 100 are shifted in the proper relationship to each other, the face plate 24 is either driven directly from spindle 86 or driven through the reducing planetary train within the faceplate. When they are directly coupled together, the faceplate rotates at the same speed and in the same direction and with the same torque as spindle 86. When driven through the planetary train, the faceplate rotates in opposite direction from the spindle at lower speed than the spindle and at higher torque than the spindle. This is all accomplished without reversing the direction of rotation of any shaft or gear in the entire train.

The numeral 110 denotes generally a closure member for precluding the entry of foreign materials into the gear box and for precluding the loss of oil therefrom. The numeral 112 denotes generally T slots for chuck jaws or driving dogs, or other suitable means, through which torque and motion are imparted from the faceplate to the wabbler 26 on the end of neck 28 of a roll 30.

With reference now to FIG. 1 the numeral 200 denotes a fixed neck chuck housing which includes a forwardly extending, substantially horizontal portion 202 to which are secured the longitudinal tracing slides 204 and 206 (see FIG. 4), and cylinder 308. Laterally spaced offset portions 208, which are disposed on opposite sides of the roll axis, and a rearward L-shaped portion including a horizontal portion 209, to which is mounted a piano rest 212, and an upstanding portion 210, to which housing cap 214 is pivoted, comprise the balance of housing 200.

The numeral 220 denotes generally a longitudinally adjustable neck chuck housing which includes a forwardly extending, substantially horizontal portion 202 to which cylinder 306 is secured and through which slides 204 and 206 pass, and a rearwardly L-shaped portion which, as in housing 200, includes a horizontal portion 209 to which piano rest 212 is secured, and an upstanding portion 222 to which housing cap 214 is pivoted.

The numerals 230 and 232 denote the lower half of neck chucks of housings 200 and 220, respectively. Chuck portion 230 is securely, though removably, mounted to portion 209 of the housing 200, whereas chuck portion 232 is adjustably secured in axial direction thereto and carried by portion 202 of the adjustable housing 220. The numerals 234 and 236 denote identical or duplicate upper neck chuck portions which are securely, though removably, mounted in depending relationship to their respective housing caps 214. In the preferred embodiment of the invention one end of each housing cap 214 is pivotally mounted, as at 238, to the upper free end of the upstanding portions 210 and 222 of housings 200 and 220, wherein the forward end of each of the housing caps 214 terminate in bifurcated portions 240 which receive screw posts 242 pivotally secured at their lower end, as at 244, to a portion of each respective housing. Suitable means, such as a nut 246, threadably engage the screw post for enabling the housing cap to be drawn downwardly for adjustably mounting the necks 28 of a roll 30 between the respective pairs of upper and lower neck chucks.

Figure 7:
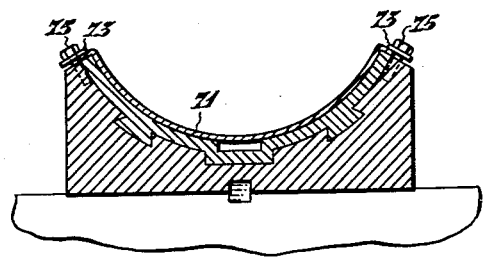
FIG. 7 is a view taken on line 7—7 of FIG. 6.

Since excessive wear in the neck chucks is disruptive to the accuracy of reproduction while tracing, thin expendable wear strips or sheets 71 of bearing material shown in FIG. 7, such as "Micarta" or "nylon" plastic, or copper or silver alloy sheet, or any other suitable sheet material, are interposed between the roll necks 28 and their corresponding neck chucks. Thus, each time a new work-piece or roll 30 is placed in the machine, a new wear strip can be economically replaced to maintain the accuracy of position of the work-piece with respect to the tracing slides.

Figure 6:
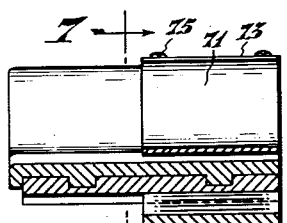
FIG. 6 is a vertical section through the neck-chuck on the center of the roll.

As best illustrated in FIGS. 6 and 7, wear strips 71 may be secured in place by suitable clamping means such as, by way of example, pressure plates 73 secured by means of bolts 75, or the like.

With reference now to FIGS. 1 and 8, the numeral 300 denotes generally a tracer box from which a hand wheel 302 and a tracer finger 304 project.

Figure 3:
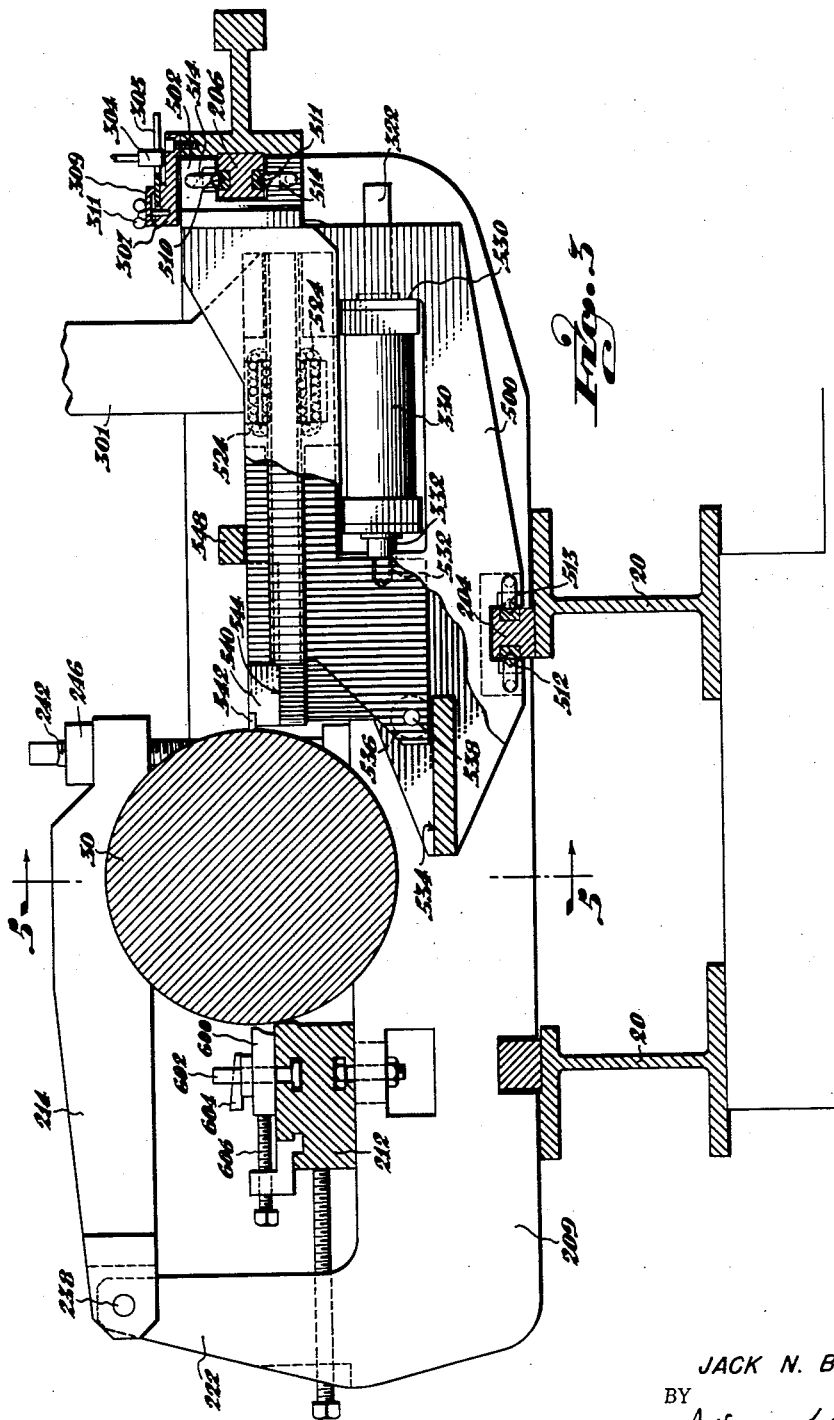
FIG. 3 is a view of the cross-slide partly in section through the lathe on a transverse vertical plane, near the center of the cross-slide of FIG. 2.

As well known in the art, tracer finger 304 engages and follows a suitable templet 305, FIGS. 1 and 3, of the shape to be reproduced in roll 30. Templet 305 may be secured to the templet bracket 307 by means of clamp bars 309 and thumb screws 311, as well known in the art. The present invention is neither concerned with nor directed to the structural or operating details of the tracer box 300, hand wheel 302, and tracer finger 304. However, for convenience of detail and understanding reference is made to U.S. Patent No. 2,332,533.

With particular reference now to FIGS. 1 and 8, numerals 306 and 308 represent longitudinal feed cylinders for actuating the saddle or carriage, which is movable longitudinally along the lathe between housings 200 and 220. The numerals 310 and 312 denote piston rods, the adjacent ends of which are connected to opposite sides 522 of the saddle or carriage 500; the opposite ends of each of piston rods 310 and 312 are secured to pistons 314 and 316, respectively.

The rearward chamber of each of cylinders 306 and 308 are interconnected by means of lines 318 and 320 to a common cylinder line 322; whereas the forward chamber of each of cylinders 306 and 308 are interconnected, by means of conduits 324 and 326, to cylinder line 328. By means of this type of construction, the rod side of one of the pistons is added to the head side of the other piston, and vice-versa, making the total area in either direction equal. In this manner, equal feed rates are produced in opposite directions when equal volumes of oil are pumped through lines 322 and 328 of the tracing system.

The numeral 330 denotes generally the cross feed cylinder which is secured to and carried by the saddle as shown at 530, FIG. 3. Its piston rod 332 is connected at its forward end to the cross slide 520, as shown at 532, FIG. 3, whereby endwise axial movement of this piston rod will move the cross slide toward and from the work-piece. As clearly illustrated in FIG. 8, piston rod 332 extends completely through piston 334 and through the heads 331 and 333 of the cylinder 330, thereby providing equal working areas on opposite sides of the piston.

Figure 2:
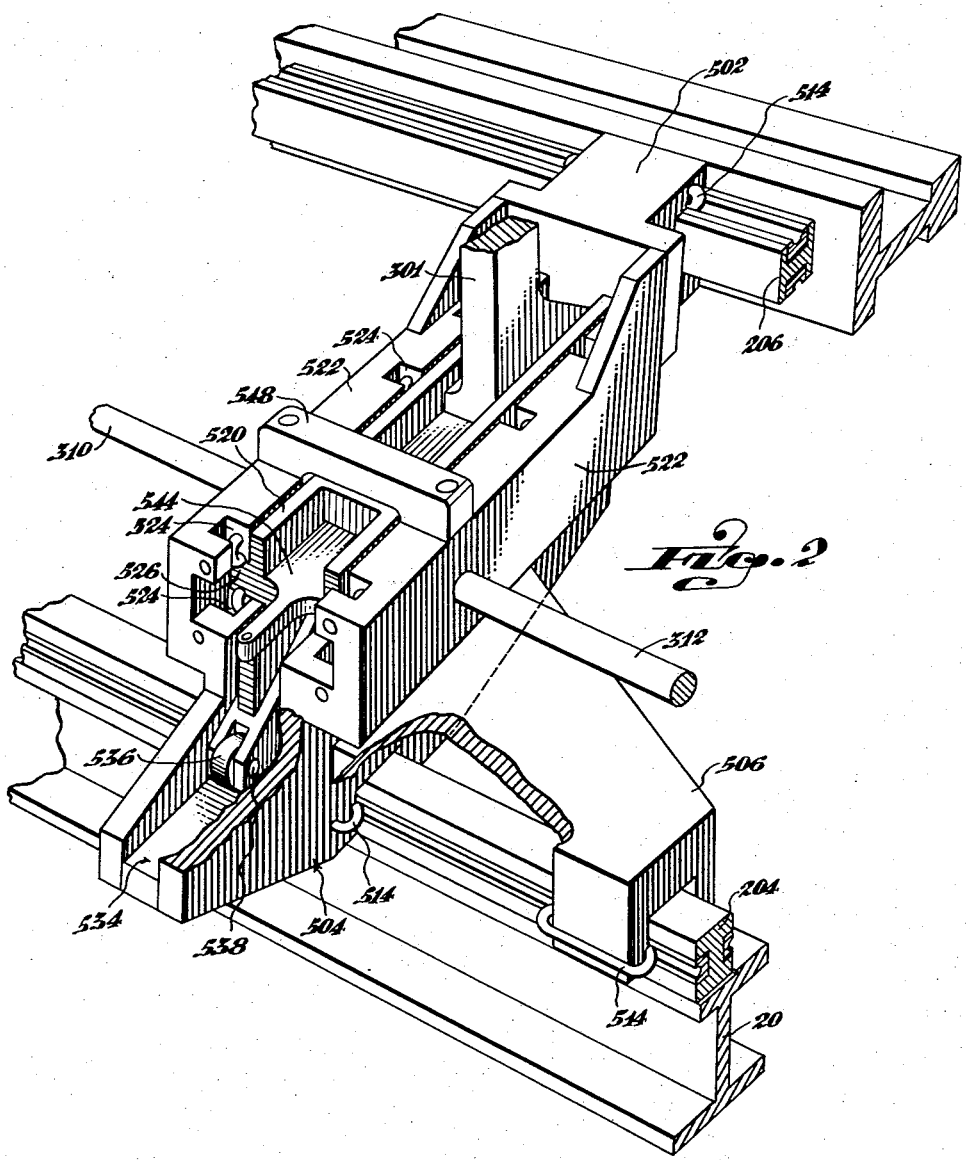
FIG. 2 is a perspective view of the saddle and cross-slide portion of the lathe of FIG. 1, comprising a detail of the invention.

As illustrated in FIG. 1, the tracer box 300 is secured to and carried by tracer bracket 301, which, as best illustrated in FIG. 2, is carried by the cross slide 520. In the preferred embodiment of the invention, tracer box 300 is adjustably secured to and carried by bracket 301; however, bracket 301 is fixedly secured to and carried by the cross slide.

With reference again to FIG. 8, the numeral 340 denotes a hydraulic reservoir provided with a filter element 342. The hydraulic fluid drawn through filter 342 by way of line 344 is forced through pump 346 of such design as to provide the necessary volume and pressure to the oil. Fluid under pressure from pump 346 is delivered to pressure line 348, thence to inlet port 350 of the tracer box mechanism 300. The numeral 352 denotes generally a relief valve, the purpose of which is to limit the pressure within lines 348 to a predetermined value.

Solely by way of example and not by way of restriction, I shall make reference to the 360° hydraulic tracer mechanism of U.S. Patent No. 2,332,533, the operating parts of which are housed within tracer box 300 and from which the hand wheel 302 and the tracer finger 304 project. The deflection imparted to tracer finger 304 by a templet produces a particular flow in each of lines 354, 356, 358 and 360: wherein the flow in lines 354 and 356 will be in opposite directions but in equal volume; and wherein the direction of flow in lines 358 and 360 will be in opposite directions but in equal volume. The volumetric relationship, of the aforesaid 360° tracer system, of flow through lines 354 and 356 to flow through lines 358 and 360 is in a sine to cosine relationship, and this relationship is utilized in guiding and controlling the velocity and direction of movement of the cutting tool.

In order to achieve the desired control to the cross slide and longitudinal slide, I provide means in association with and operable by fluid from lines 354 and 356 for the purpose of producing a proportionate flow in lines 362 and 364, which feed opposite ends of cylinder 330, wherein the flow in these lines is in exactly the same direction as in lines 354 and 356, respectively but in greater or lesser volume by a specific and predetermined relationship. By the same token the direction of flow of fluid through lines 328 and 322 is controlled to produce a response in the tracing slides. The net result being the same as though the tracer box 300 were directly connected to the actuating cylinders 330, 308 and 306, except that the rate of response is selectively in greater or lesser magnitude. Thus, I impart to the system a means of suitably controlling relatively slow response rates without impairing its ability to control relatively fast rates.

The numeral 366 denotes a fixed displacement hydraulic motor and numeral 368 a variable displacement pump driven by motor 366, wherein operation of the motor will determine the direction and volume of the oil handled by pump 368. The fixed and variable volume features could be suitably interposed on pump 368 and motor 366 without affecting the object of this invention.

A pressure regulator valve 370 in line 348 is utilized to provide an adjustable supercharge pressure in line 372. This supercharge pressure continuously feeds the intake side of pump 368 and the low pressure side of cylinder 330 regardless of the direction of movement of the piston. The pump 368 will then build up the supercharge pressure of line 372 from its preselected pressure to whatever pressure is necessary to make the movement of the piston take the volumetric output of the pump. It will be noted that the maximum pressure differential that can be developed by the output side of the pump, which is the high pressure side of the cylinder 330, is limited by the relief valve 374 and its setting, which by-passes the flow of oil around the cylinder back into the intake side of pump 368. The minimum pressure on the low pressure side of the cylinder is always constant at the supercharge pressure.

It follows then that the force required to feed the tool into the work is produced by the working area of the pistons and the pressure differential between the supercharge pressure and output pressure of their respective pumps regardless of the direction of movement of the pistons. And the rate of feed is produced by the volume of oil displaced by the pumps.

For clarity of detail and understanding, the corresponding portions of the various elements appearing in FIG. 8 have been duplicated. That is, the motor 378 corresponds to motor 366, and pump 380 corresponds with pump 368 in the foregoing description, etc.

In FIG. 9, I have illustrated a control circuit for the purpose of simultaneously controlling the volumetric displacement of pumps 368 and 380 such that they are always equal during transition from one displacement to another, to maintain the sine-cosine relationship of their volumetric output; which in turn controls the operating characteristics of the cross slide and the longitudinal slide. The cylinders 390 and 392 are integral components of said pumps 368 and 380 and position the displacement control yoke in said pumps.

The numeral 394 denotes generally a commercially available flow divider valve having an intake port 396 connected with high pressure line 348. The flow divider valve 394 also includes a pair of outlet ports 398 and 399 through which identical volumes of oil flow due to the inherent operating characteristics of the valve.

The numeral 400 denotes generally a double four-way valve, also commercially known as a directional control valve. It has two pressure ports 402 and 404, two exhaust ports 406 and 408, and two pairs of cylinder ports 410—411 and 412—413. The first pair of cylinder ports 410 and 411 are connected to opposite ends of cylinder 390, and the second set of cylinder ports 412 and 413 are connected to opposite ends of cylinder 392 as illustrated.

Any suitable means may be utilized for actuating directional control valve 400 for effecting a reversal of direction of flow of fluid from pressure ports 402 and 404 to their respective cylinders 390 and 392, such as, by way of example, a push button controlled solenoid 397, or the like.

At this point it should be understood that the purpose of the control circuit of FIG. 9 is to permit an operator to quickly and expeditiously change the rate of movement of the tool from feed to rapid traverse: that is, during those periods of time when the individual pistons of cylinders 390 and 392 are adjacent to the left ends, for example, of their respective cylinders, the tool would then be in a normal feed rate. However, actuation of the directional control valve 400 for reversing the flow of fluid to cylinders 390 and 392 will almost instantaneously result in shifting of the pistons to the other end of their stroke, thereby changing the feed rate to rapid traverse by increasing the volumetric displacement of both pumps 368 and 380 by an equal amount, and maintaining equality throughout the change from normal feed rate to rapid traverse. This same condition of maintaining the volumetric displacement of pumps 368 and 380 also occurs while shifting from rapid traverse rate to feed. It should be understood that suitable stops, such as, by way of example, 393 and 395 may be provided in each of cylinders 390 and 392 to effectively and easily control the overall travel of the respective pistons thereof. And in this manner the rate of movement along the cross slide and the longitudinal slide may be very accurately adjusted within prescribed limits.

In passing, it should be understood that the feed rate within any one particular range as determined by the displacement of the pumps 368 and 380 can be varied at infinite increments by adjusting the throttle valve settings within the tracer box 300.

Figure 5:
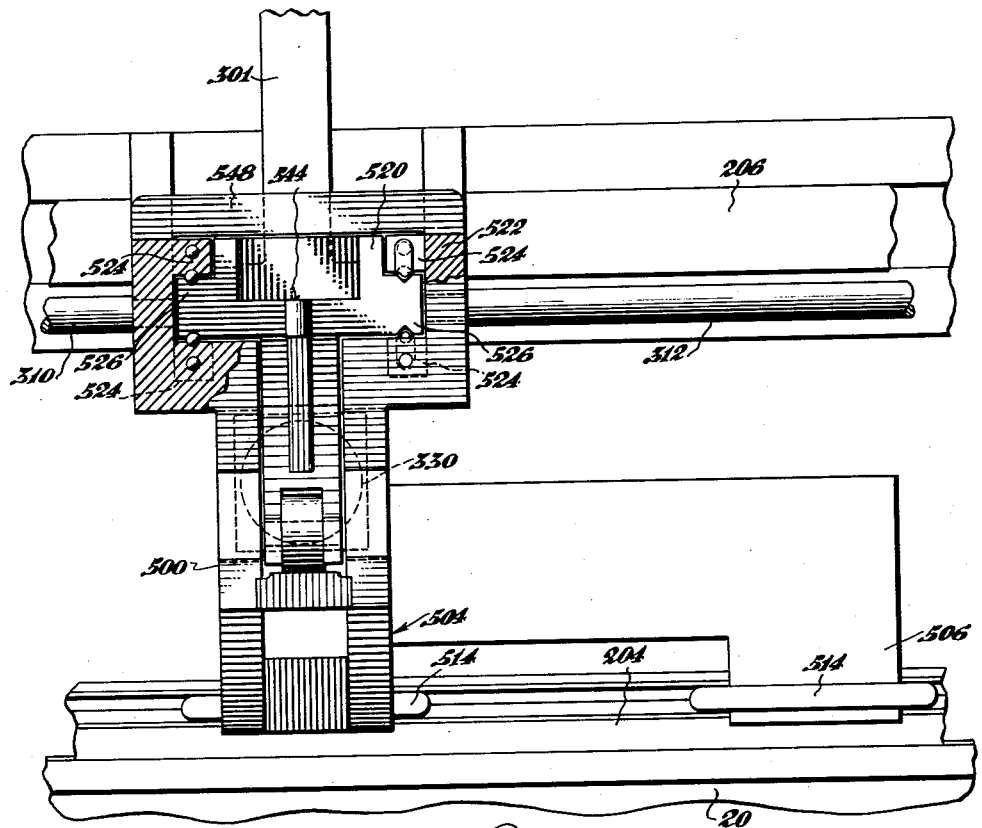
FIG. 5 is a view taken on line 5—5 of FIG. 3.

In FIG. 1, the numeral 500 denotes generally a saddle or carriage which is mounted for longitudinal or endwise movement relative to and along the lathe axis. As best illustrated in FIGS. 2, 3, and 5, the saddle includes an outer bearing portion 502 which engages and rides upon outer slide 206. The saddle also includes a central inner bearing portion 504 and an outboard bearing portion 506, wherein the inner bearing portion 504 and the outboard bearing portion 506 slidably engage, and are supported by, the inner slide 204.

As best illustrated in FIGS. 2 and 3, the outer bearing portion 503 includes upper and lower sets of re-circulating balls, denoted generally by the numerals 510 and 511. Said balls engage and roll between complementary ways at outer bearing portion 502 and outer slide 206, providing free longitudinal movement of the outer bearing portion on the outer slide while effectively precluding motion transverse thereto, thereby providing a linear slide of anti-friction characteristics.

Similarly as illustrated in FIG. 3, re-circulating anti-friction balls 512 and 513 are disposed between inner slide 204 and both the outboard bearing portion 506 and the inner bearing portion 504. In this manner the inner portion of the saddle is confined to linear motion in parallelism with the linear motion of the outer end thereof, and movement in any and all other directions, including rotation, is eliminated. In FIG. 2, the numeral 514 denotes, generally duplicates of ball return tubes in which the balls 510 and 511, 512, and 513 re-circulate for providing the anti-friction mounting illustrated in FIG. 3.

Longitudinal or endwise motion is imparted to saddle 500 through piston rods 310 and 312 which are actuated by means of cylinders 308 and 306 as hereinbefore more fully explained.

The numeral 520 in FIG. 2 denotes generally the cross slide portion of the carriage or saddle, said cross slide being mounted on anti-friction means for movement toward and from the axis of the lathe and at right angles to the longitudinal movement of the saddle.

With particular reference now to FIGS. 2 and 5, the numerals 522 represent portions of the saddle which contain bearing portions 524. Balls are interposed between these various bearing portions 524 and complementary portions 526 of the cross slide, thereby mounting the cross slide for pure linear motion at right angles to the axis of the lathe. This bearing suspension also effectively precludes any twisting or rotational movement of the cross slide relative to the saddle.

Referring to FIG. 3, it will be noted that cylinder 330 is utilized for imparting endwise movement to the cross slide, said cylinder being rigidly secured to and carried by the saddle as at 530. One end of piston rod 332 extends through a complementary opening in the saddle. The other end of piston rod 332 engages the cross slide as illustrated in FIG. 3 at 532. The numeral 534 of FIGS. 2 and 3 denotes a track which is rigidly secured to, and comprises a part of, the inner, or tool supporting end of the saddle. A roller 536, journalled as at 538 to the inner end of the cross slide, is normally disposed just out of contact with the upper supporting surface of track 534. The relationship of roller 536 to track 534 is such that the roller will only engage the track after the tool supporting end of the cross slide has been deflected downwardly by a very minute dimension induced by an excessive deflecting load applied to the tool supporting end of the cross slide. The purpose of this relationship is to preclude excessive load on the more precise ball-ways of the cross slide by transfer of a large portion of heavy loads from the ball-ways to the heavier bearing support effected by the roller 536 and track 534, particularly during roughing cuts.

In FIG. 3 the numeral 540 denotes generally the shank of a tool and the numeral 542 the cutting tip thereof.

Figure 4:
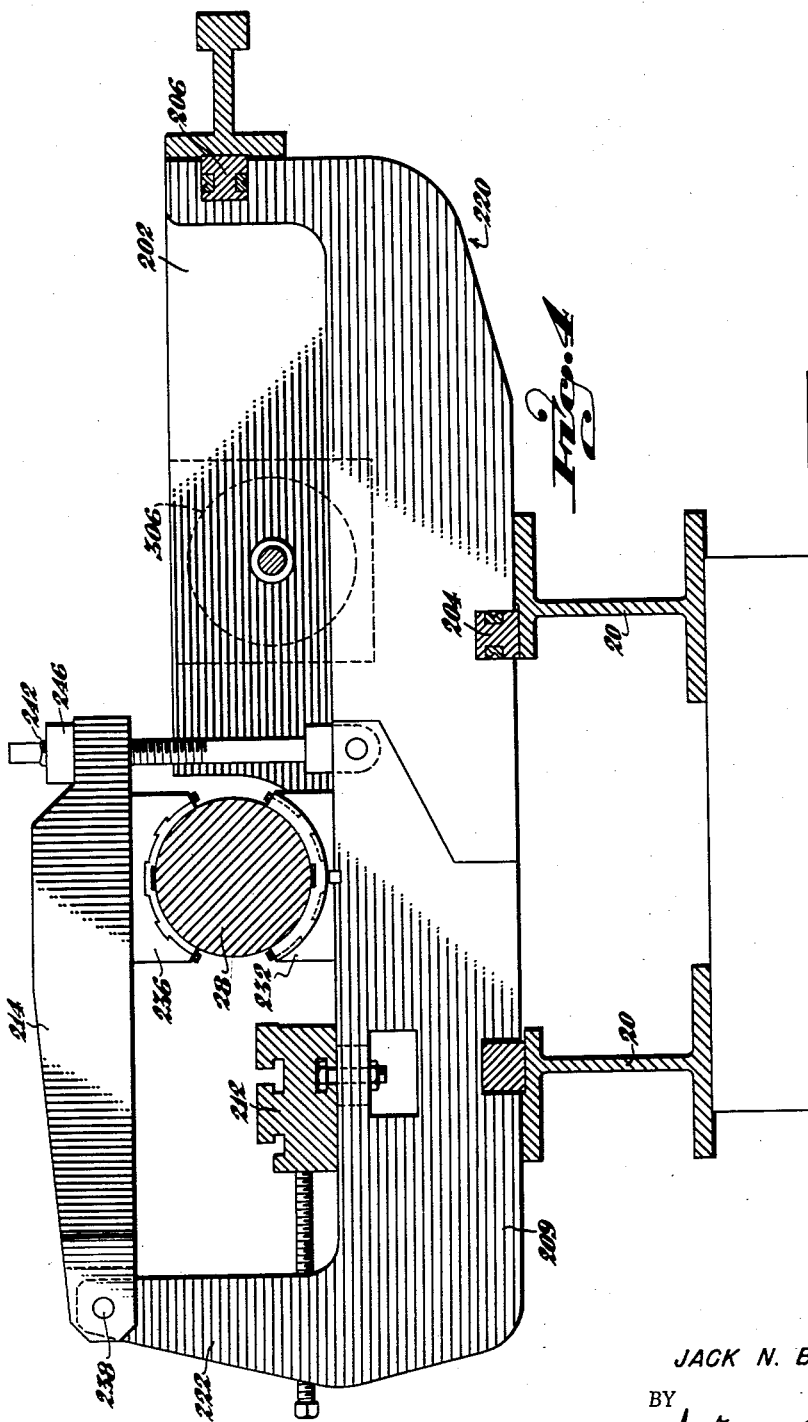
FIG. 4 is a sectional view on line 4—4 of FIG. 1.

With reference now to FIG. 2, the numeral 544 denotes the tool post or tool platform on which the shank of tool 540 is suitably secured by any means not germane to the present invention. A tie bar 548 spanningly engages and rigidly interconnects side portions 522 of the saddle which are disposed on opposite sides of the cross slide. In FIGS. 3 and 4, and in particular in FIG. 3, it will be noted that the contour turning means is located on the right side of roll 30, whereas the form turning means are located to the left side thereof. The numeral 212 denotes generally a so-called piano rest, which comprises a rugged, heavy-duty, elongate member adapted to extend substantially the length of the span between members 200 and 201. The piano rest is provided with a longitudinal T-slot extending throughout its bottom surface and a pair of longitudinal T-slots which extend throughout its upper surface, the lower T-slot serving as means by which the piano rest is securely though releasably fastened to and between portions 209 of both housings, 200 and 202.

A form tool 600 is rigidly though adjustably secured to the upper surface of the piano rest 212 by means of yoke 602, wedge 604, and a jack screw 606. It should be clearly understood that the present invention is neither concerned with nor directed to the particular means by which the piano rest is mounted to the housings, nor is the invention directed to or concerned with the particular means by which forming tool 600 is secured to the piano rest, it being understood that suitable means will be provided for effecting the desired mounting.

In use of the device, the work-piece, roll 30, is supported on its necks, and through the headstock it is rotated in a clockwise direction at high speed and with low torque for tracing cuts. Then the rotation of the roll may be reversed in direction and driven in low speed with high torque for operation of the form turning cuts using the tool 600 mounted on the piano rest. Said form turning cuts are necessitated when, by the nature of the shape and/or surface finish required in roll 30, the tracing operation becomes too difficult to be economical.

If desired, electric motor 32 and torque limit coupling 38, of FIG. 10, may be replaced with a hydraulic motor, coupled directly to shaft 36, and a pressure relief valve limiting the pressure of the fluid pumped to the motor. If constant torque variable speed characteristics are desired, a fixed displacement hydraulic motor driven by a variable displacement constant speed hydraulic pump may be used; whereas, if constant power variable speed characteristics are desired, a variable displacement constant speed hydraulic motor driven by a fixed displacement hydraulic pump may be used.

It should likewise be understood that in certain instances it may be desirable to replace the linear hydraulic motors 306, 308 and 330 with rotational hydraulic motors driving rack and pinion, or screw and nut combinations, or the like, to accomplish the same purpose.

It should be understood that various changes and modifications may be made, within the scope of the appended claims, without departing from the spirit of the invention.

What is claimed is:

1. A roll lathe comprising a bed, a pair of transverse laterally spaced support members mounted relative to the bed, means on each of said members to rotatably support the necks of a roll to be turned, a headstock assembly secured to and carried by said bed, said assembly including a rotatable face plate, a drive shaft, means for imparting rotary motion to said shaft, a speed reducing planetary train means connecting one of the elements of said planetary train to said shaft, means for selectively placing the faceplate in direct driven relationship with the shaft, and other means for selectively placing the faceplate in driven relationship through that element and the remaining elements of said planetary train for rotating the faceplate in opposite direction to, at slower speed and higher torque than said shaft.

2. In a roll lathe, a headstock assembly including a rotatable face plate, a drive shaft, means for imparting rotary motion to said drive shaft, and means comprising a driving shaft, a first planetary train in driven relationship with said driving shaft, said first planetary train including an output shaft, means for selectively placing the output shaft in direct driven relationship with said driving shaft, and other means for selectively placing said output shaft in driven relationship with the driving shaft through said first planetary train for rotating the output shaft at a lower speed and higher torque than said driving shaft, drive means interconnecting the output shaft of said first planetary train relative to said drive shaft, a second planetary train interposed between said first drive shaft and face plate, means for selectively placing the face plate in direct driven relationship with the drive shaft, and other means for selectively placing the face plate in driven relationship with the drive shaft through said secondary planetary train for rotating the face plate in opposite direction to, at slower speed and higher torque than said drive shaft.

3. In a head stock assembly the combination of a face plate, a drive shaft, and planetary drive means interconnecting said face plate in driven relationship with said drive shaft, said drive means including a sun gear integral with said drive shaft, a spider circumscribing said sun gear, planetary gears rotatably secured to and carried by said spider, said planetary gears meshing with said sun gear, a ring gear concentric with said drive shaft and spider meshing with said planetary gears and fixedly secured to said face plate, a first shifter ring mounted for axial movement relative to said face plate for selectively coupling said face plate directly to said drive shaft when in one position and for uncoupling said face plate from said drive shaft when in the other position, a splined annulus concentric with said drive shaft and fixed relative to the headstock, a second shifter ring for selectively coupling said spider to said annulus for locking said spider against rotation whereby said sun gear will be placed in driving relationship with said planetary gears, which in turn will drive said ring gear to which the face plate is fixed, whereby said face plate will be driven at a slower speed, at a higher torque, and in an opposite direction from said drive shaft.

4. A roll lathe comprising a bed, a pair of transverse laterally spaced support members carried by said bed, means on said members for rotatably supporting the necks of a roll to be turned, a headstock assembly supported by said bed, said headstock assembly including a drive shaft, power means for driving the drive shaft, a torque limiting means connected between said drive shaft and said power means for preventing overload damage, a face plate supported by said headstock assembly for relative rotation with respect to said drive shaft, a speed reducing planetary gear train interposed between said shaft and said face plate and having certain components thereof in positive driving relationship with the driven shaft and the face plate, means for selectively positively connecting said face plate to said drive shaft for providing a direct drive in a forward direction between the drive shaft and the face plate, and other means for selectively positively locking a portion of said planetary gear train in fixed position to cause the face plate to be driven through said planetary gear train in a reverse direction opposite to said forward direction at a slower speed and higher torque than said drive shaft whereby said face plate is adapted to be driven in a high speed direct forward drive and a low speed reverse drive and said torque limiting means protects against overload damage in both forward and reverse drive.

5. Apparatus as defined in claim 4, wherein said planetary gear train comprises a sun gear means on said drive shaft and a ring gear means carried by said face plate, a spider, planetary gears rotatably supported by said spider and being in driving engagement with said sun gear and said ring gear, said locking means being restrained from rotation and mounted for selective engagement with a portion of said spider to lock the spider and restrain the spider from rotation.

6. The roll lathe of claim 1, wherein said headstock assembly includes torque limiting means to protect said drive shaft from overload damage.

7. The roll lathe of claim 1, wherein said headstock assembly includes torque limiting means comprising a mechanical friction clutch to protect said drive shaft from overload damage.

References Cited in the file of this patent

UNITED STATES PATENTS

| | | |
|---|---|---|
| 567,793 | Riddell | Sept. 15, 1896 |
| 734,997 | Thomas | July 28, 1903 |
| 780,972 | Bowen | Jan. 31, 1905 |
| 785,258 | Landis | Mar. 21, 1905 |
| 876,723 | Leonard | Jan. 14, 1908 |
| 1,611,191 | Heard | Dec. 21, 1926 |
| 1,736,998 | Darrach | Nov. 26, 1929 |
| 2,016,482 | Brown | Oct. 8, 1935 |
| 2,473,307 | Seipt | June 14, 1939 |
| 2,560,958 | King | July 17, 1951 |
| 2,564,826 | Yoder | Aug. 21, 1951 |
| 2,575,522 | McFarland | Nov. 20, 1951 |
| 2,586,604 | Bennett | Feb. 19, 1952 |
| 2,670,633 | Schoepe | Mar. 2, 1954 |
| 2,680,359 | Bowers | June 8, 1954 |
| 2,696,581 | Peterson | Dec. 7, 1954 |
| 2,697,373 | Siekmann | Dec. 21, 1954 |
| 2,713,283 | Lomazzo | July 19, 1955 |
| 2,720,129 | De Haas | Oct. 11, 1955 |
| 2,729,077 | Holloway | Jan. 3, 1956 |
| 2,736,222 | Campbell | Feb. 28, 1956 |
| 2,753,725 | De Vlieg | July 10, 1956 |
| 2,791,885 | Sassen | May 14, 1957 |
| 2,817,991 | Richet | Dec. 31, 1957 |
| 2,857,750 | Fox | Oct. 28, 1958 |

FOREIGN PATENTS

| | | |
|---|---|---|
| 9,855 | Great Britain | 1885 |

OTHER REFERENCES

Motor Publication, pages 72, 73, June 1948.